(12) United States Patent
Clark et al.

(10) Patent No.: US 7,400,238 B2
(45) Date of Patent: Jul. 15, 2008

(54) BRAKE LIGHT SYSTEM

(75) Inventors: Warren Clark, Evans, GA (US); Oliver A. Bell, Jr., Aiken, SC (US); Aric Singletary, Hephzibah, GA (US)

(73) Assignee: Textron Inc., Providence, RI (US)

( * ) Notice: Subject to any disclaimer, the term of this patent is extended or adjusted under 35 U.S.C. 154(b) by 160 days.

(21) Appl. No.: 11/421,882

(22) Filed: Jun. 2, 2006

(65) Prior Publication Data
US 2007/0279207 A1  Dec. 6, 2007

(51) Int. Cl.
*B60Q 1/44* (2006.01)
(52) U.S. Cl. .......................... 340/479; 340/464; 340/467; 340/468
(58) Field of Classification Search ................ 340/479, 340/665, 463, 464, 467, 468, 439, 901, 903, 340/905, 686.1; 303/3; 701/70; 362/487, 362/496
See application file for complete search history.

(56) References Cited

U.S. PATENT DOCUMENTS

| | | | |
|---|---|---|---|
| 5,589,817 A | * | 12/1996 | Furness ....................... 340/467 |
| 5,725,075 A | * | 3/1998 | Chou ....................... 188/1.11 E |
| 6,105,737 A | * | 8/2000 | Weigert et al. .............. 188/158 |
| 2003/0048182 A1 | * | 3/2003 | Fulks et al. ................. 340/479 |

FOREIGN PATENT DOCUMENTS

WO    2004/068254    8/2004

* cited by examiner

*Primary Examiner*—Anh V La
(74) *Attorney, Agent, or Firm*—Harness Dickey & Pierce P.L.C.

(57) ABSTRACT

A lightweight utility vehicle brake lighting system comprising a brake pedal position sensor, a controller and a brake light circuit. The brake pedal position sensor senses the position, e.g., amount of depression, of a vehicle brake pedal. The controller of interprets a brake pedal position signal from the brake pedal position sensor to determine the position of the brake pedal. When the controller determines that the brake pedal has been depressed to initiate a braking operation of the vehicle, the controller transmits a brake light signal to an electronic switching device, such as a relay switch, of the brake light circuit. Upon receipt of the brake light signal, the electronic switching closes to complete, or close, the brake light circuit to enable a current flow through the brake light circuit, thereby illuminating at least one brake light of the vehicle.

24 Claims, 4 Drawing Sheets

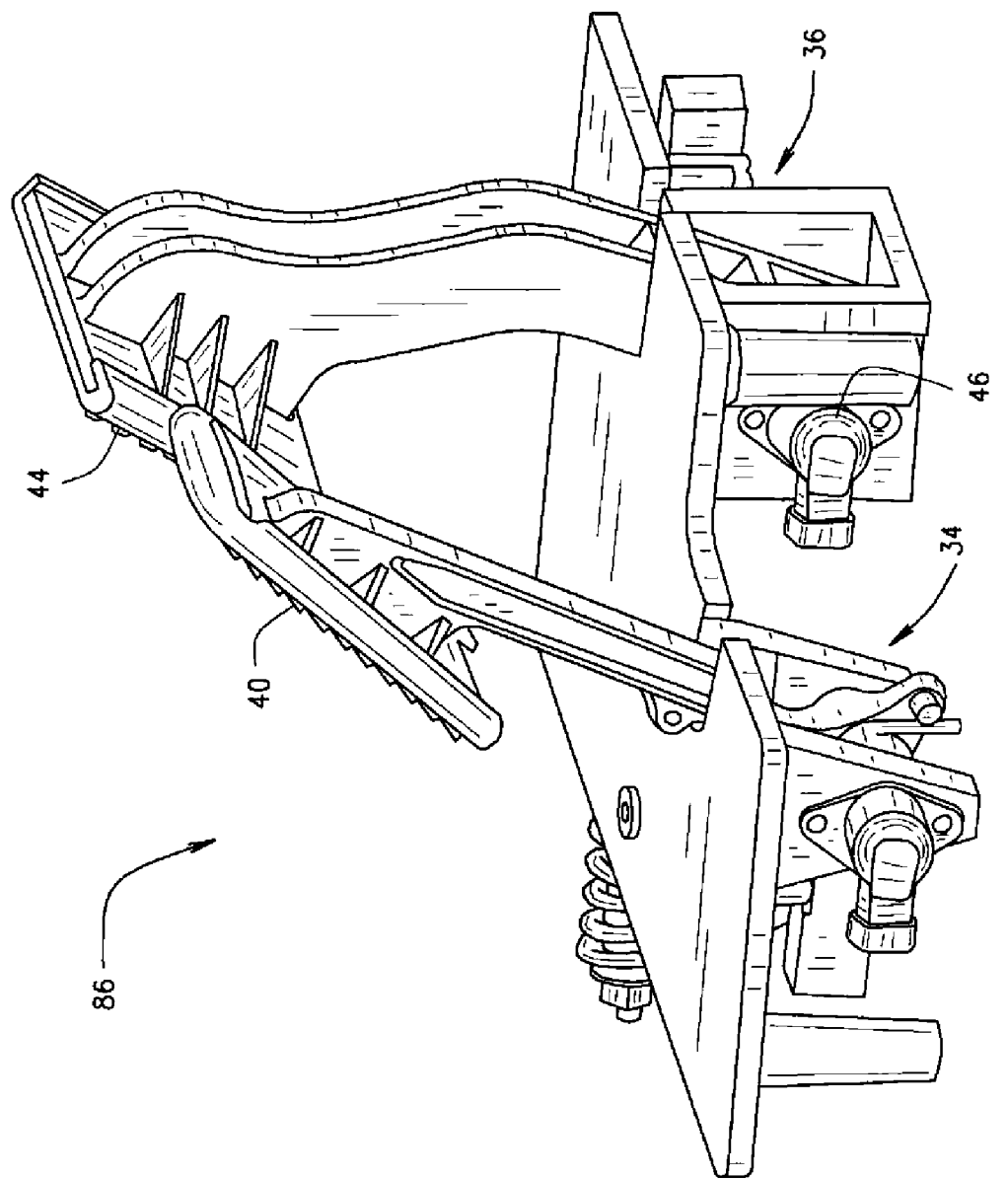

BRAKE LIGHT SYSTEM

FIELD

The present disclosure relates to a system for operating a brake light in a vehicle.

BACKGROUND

Braking systems of lightweight utility vehicles, such as maintenance vehicles, shuttle vehicles and golf cars, generally include a mechanical brake light switch that is closed by depression of the brake pedal. Closing the brake light switch completes, or closes, a circuit that electrically connects a power source, e.g., a 12V battery, to one or more brake lights. Thus, closing the circuit allows electrical current to flow through the brake light(s) causing the brake light(s) to illuminate. When the brake pedal is released, the mechanical brake light switch opens, breaking the circuit and extinguishing the brake light(s). Such mechanical brake light switches often wear and fail over time, and are frequently susceptible to contamination and/or damage by liquids and debris, e.g., water and dirt, that can increase the occurrence of failures.

SUMMARY

A brake lighting system for a lightweight utility vehicle is provided. The brake lighting system comprises a brake pedal position sensor, a controller and a brake light circuit. The brake pedal position sensor senses the position, e.g., amount of depression, of a vehicle brake pedal. The controller of interprets a brake pedal position signal from the brake pedal position sensor to determine the position of the brake pedal. When the controller determines that the brake pedal has been depressed to initiate a braking operation of the vehicle, the controller transmits a brake light signal to an electronic switching device, such as a relay switch, of the brake light circuit. Upon receipt of the brake light signal, the electronic switching closes to complete, or close, the brake light circuit to enable a current flow through the brake light circuit, thereby illuminating at least one brake light of the vehicle.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 4, is an isometric illustration of the modular A&B assembly of the vehicle shown in FIG. 1, in accordance with various embodiments of the present disclosure;

DETAILED DESCRIPTION

The following description of various embodiments is merely exemplary in nature and is in no way intended to limit the present teachings, application, or uses.

Figure 1:
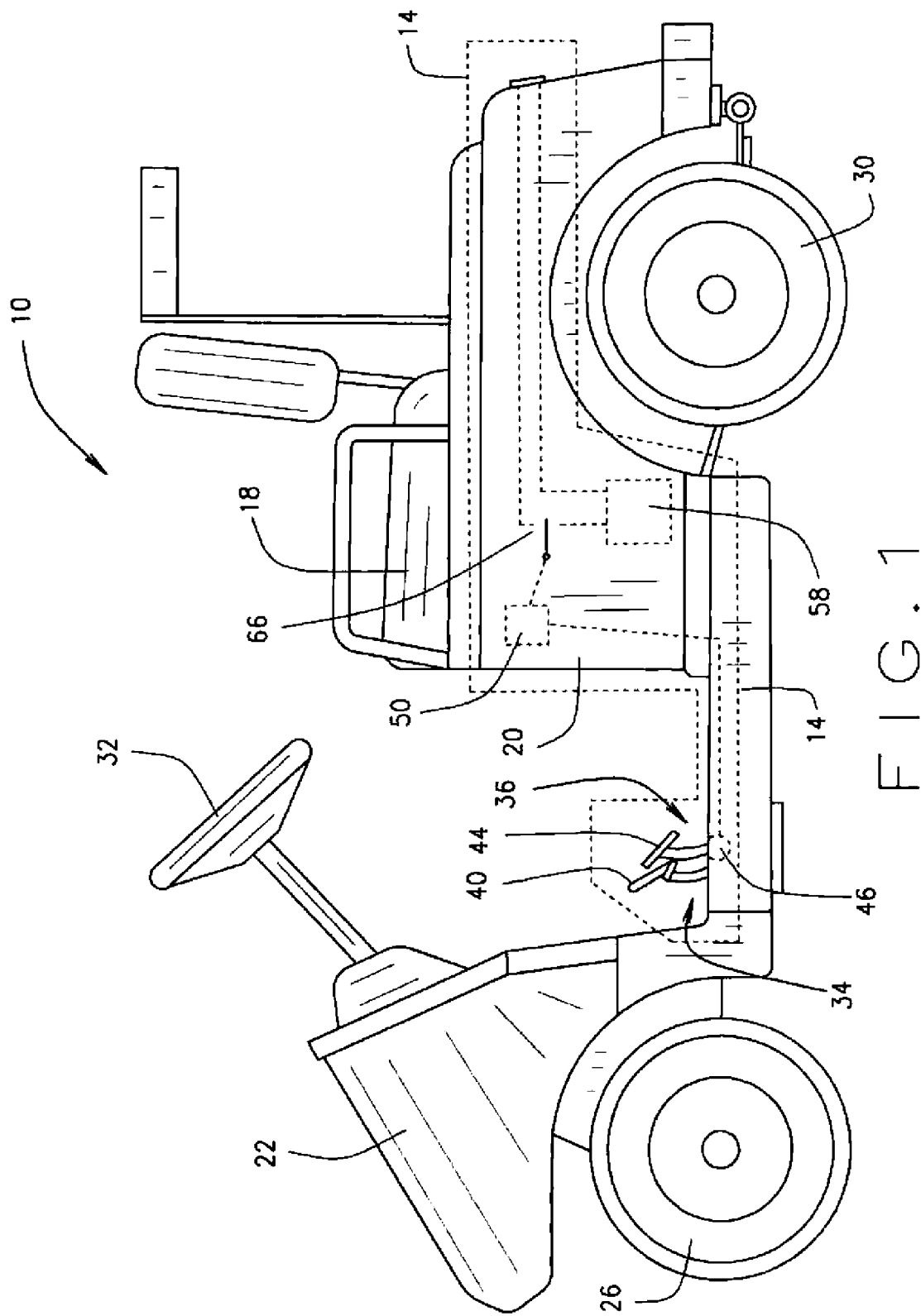
FIG. 1 is a side view of a light-weight utility vehicle including a brake lighting system for controlling illumination of at least one vehicle brake light, in accordance with various embodiments of the present disclosure.

FIG. 1 illustrates a light-weight utility vehicle 10, such as a small cargo/maintenance vehicle, a shuttle vehicle or a golf car, that includes a brake lighting system 14 for controlling illumination of at least one brake light 16 The vehicle 10 also generally includes a seat assembly 18 mounted to a rear body section 20, a front body section 22 and a pair of front wheels 26 that operate to steer the vehicle 10. Additionally, the vehicle 10 generally includes a pair of rear wheels 30, at least one of the rear wheels 30 functioning as a drive wheel for propelling vehicle 10, and a steering wheel 32 used to control a steering angle of the front wheels 26. The vehicle 10 further can comprise an accelerator pedal subassembly 34 and brake pedal subassembly 36 used to control acceleration and deceleration of the vehicle 10. More particularly, the accelerator pedal subassembly 34 comprises an accelerator pedal 40 that can be depressed to initiate and control an amount of motive force generated by a primary mover (not shown) and applied to the vehicle 10. Similarly, the brake pedal subassembly 36 comprises a brake pedal 44 that can be depressed to initiate and control a braking operation of the vehicle 10. A braking operation can be an application or depression of the brake pedal 44 to decelerate the vehicle 10 or maintain the vehicle 10 in a stopped state.

Figure 2:
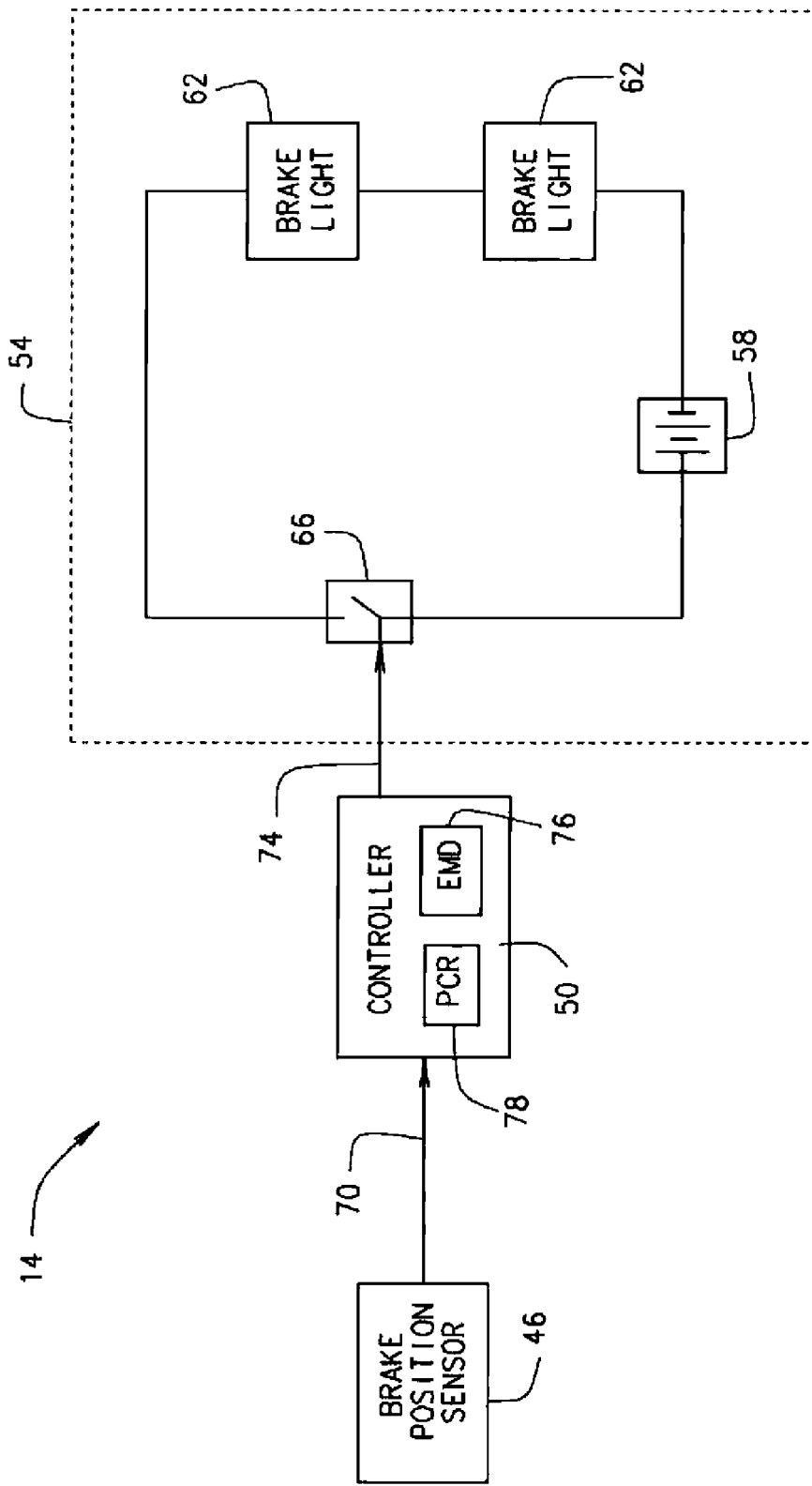
FIG. 2 is a block diagram of the brake lighting system shown in FIG. 1, in accordance with various embodiments of the present disclosure.

Referring to FIG. 2, in accordance with various implementations, the brake lighting system 14 can comprise a brake pedal position sensor 46 communicatively connected to a controller 50, e.g., a microcontroller, that is communicatively connected to a brake light circuit 54. The brake light circuit 54 can comprise a power source 58, e.g., a 12V battery, that provides power, i.e., voltage across and current though at least one brake light 62. The brake light circuit 54 also comprises an electronic switching device 66 that is communicatively connected to the controller 50 and controls the flow of current through the brake light circuit 54. The position sensor 46 is operably connected to the brake pedal subassembly 36 and is configured to sense a position, e.g., an amount of depression, of brake pedal 44. The brake pedal position sensor 46 outputs a sensor signal, e.g., a voltage output, in accordance with a position of brake pedal 44. More specifically, the brake pedal sensor 46 communicates with the controller 50 via a brake pedal position signal 70 that indicates the position of the brake pedal 44, ranging from a released, or non-depressed, position to a fully depressed position. The brake pedal position signal 70 can be variable between a minimum value when the brake pedal 44 is in the released position and a maximum value when the brake pedal 44 is in the fully depressed position.

When the brake pedal 44 is depressed to initiate a braking operation of the vehicle 10, the brake pedal sensor 46 transmits the brake pedal position signal 70 to the controller 50 indicating initiation of the braking operation. The controller 50 interprets the brake pedal position signal 70 to determine the position of the brake pedal 44. If the controller determines that the brake pedal 44 has been depressed to initiate a braking operation, the controller transmits a brake light signal 74, e.g., a voltage output, to an electronic switching device 66.

The electronic switching device 66 can be any electronic switching device suitable for receiving the brake light signal 74 and controlling the flow of current through the brake light circuit 54. For example, the electronic switching device 66 can be a relay switch, a transistor or a triac. In various implementations, the electronic switching device 66 is normally open such that current does not flow through the brake light circuit 54 and the brake light(s) 62 is/are normally extinguished, i.e. not illuminated. When the electronic switching device 66 receives the brake light signal 74 from the controller 50, the electronic switching device 66 closes to complete, or close, the brake light circuit 54. Closing the brake light circuit 54 electrically connects the power source 58 to the brake light(s) 62 such that current flows through the brake light circuit 54 illuminating brake light(s) 62 to indicate the braking operation of the vehicle 10.

Accordingly, when the brake pedal 44 is released, the controller 50 interprets the brake pedal position signal 70 from the brake pedal position sensor 46 indicating that the brake pedal 44 has been released. The controller 50 then terminates, or prevents transmission of, the brake light signal 74 to electronic switching device 66. In response to the termination of the brake light signal 74, the electronic switching device 66 opens, breaking the brake light circuit 54, and preventing or terminating current flow through the brake light circuit 54 such that the brake light(s) 62 are extinguished. In various embodiments, the controller 50 further monitors a parking brake operation of the vehicle 10. As well understood by one skilled in the art, a parking brake operation is implemented to maintain application of a vehicle brake system, e.g., the application of brake shoes to a brake drum, to retain the vehicle 10 in a stopped state once the vehicle 10 has decelerated to a stop. Upon determination that a parking brake operation has been implemented, the controller 50 terminates, or prevents transmission of, the brake light signal 74 to electronic switching device 66. In response to the termination of the brake light signal 74, the electronic switching device 66 opens, breaking the brake light circuit 54, and extinguishing the brake light(s) 62.

In various embodiments, the controller 50 can comprise an electronic memory device 76 for storing programming executed by a controller processor 78. The programming is executed by the processor 78 to interpret the brake position signal 70 and transmit the brake light signal 74 when the brake position signal 70 exceeds a predetermined upper value, or upper threshold. For example, in various embodiments, the brake position signal 70 can comprise a voltage signal output by the brake position sensor 46 and input to the controller 50. The programming is executed by the processor 78 to interpret the brake position signal 70 and determine whether the voltage level of the brake position signal 70 exceeds a predetermined upper voltage value, or upper threshold. If the upper voltage threshold is exceeded, indicating that a braking operation has been initiated, the controller transmits the brake light signal 74 to the electronic switching device 66 to close the brake light circuit 54 and illuminate the brake light(s) 62.

Furthermore, the programming is executed by the processor 78 to interpret the brake position signal 70 and terminate, or prevent, transmission of the brake light signal 74 when the brake position signal 70 is less than, or below, a predetermined lower value, or lower threshold. For example, in various embodiments wherein the brake position signal 70 comprises a voltage signal, execution of the programming determines whether the voltage level of the brake position signal 70 is below a predetermined lower voltage value, or lower threshold. If the value of the brake position signal 70 is determined to be below the lower voltage threshold, indicating that a non-braking operation has been commanded, the controller prevents transmission of the brake light signal 74. Accordingly, the electronic switching device 66 is moved to, or retained in, the open position such that current will not flow through the brake light circuit 54 and the brake light(s) 62 will be transitioned to or retained in an extinguished state, i.e., not illuminated state.

In various embodiments, the upper threshold value can comprise a percentage of the maximum value of the brake position signal 70. For example, the upper threshold value can comprise approximately 5% to 15% of the maximum value of the brake pedal position signal 70. Or, for example, the upper threshold value can comprise approximately 10% of the maximum value of the brake pedal position signal 70. More particularly, for example, the maximum value of the brake pedal position signal 70 can be approximately 5 volts and the upper threshold value can be approximately 0.5 volts.

Additionally, in various implementations, the lower threshold value can also comprise a percentage of the maximum value of the brake position signal 70. For example, the lower threshold value can comprise approximately 2% to 8% of the maximum value of the brake pedal position signal 70. Or, for example, the lower threshold value can comprise approximately 4% of the maximum value of the brake pedal position signal 70. More particularly, an exemplary maximum value of the brake pedal position signal 70 can be approximately 5 volts and the lower threshold value can be approximately 0.2 volts.

In some embodiments, the upper and lower threshold values of the brake position signal 70 are such that there is an overlapping range between illuminating and extinguishing the brake light(s) 62. The overlapping range prevents 'flickering', i.e., intermittent or inconsistent illumination, of the brake light(s) 62.

Figure 3:
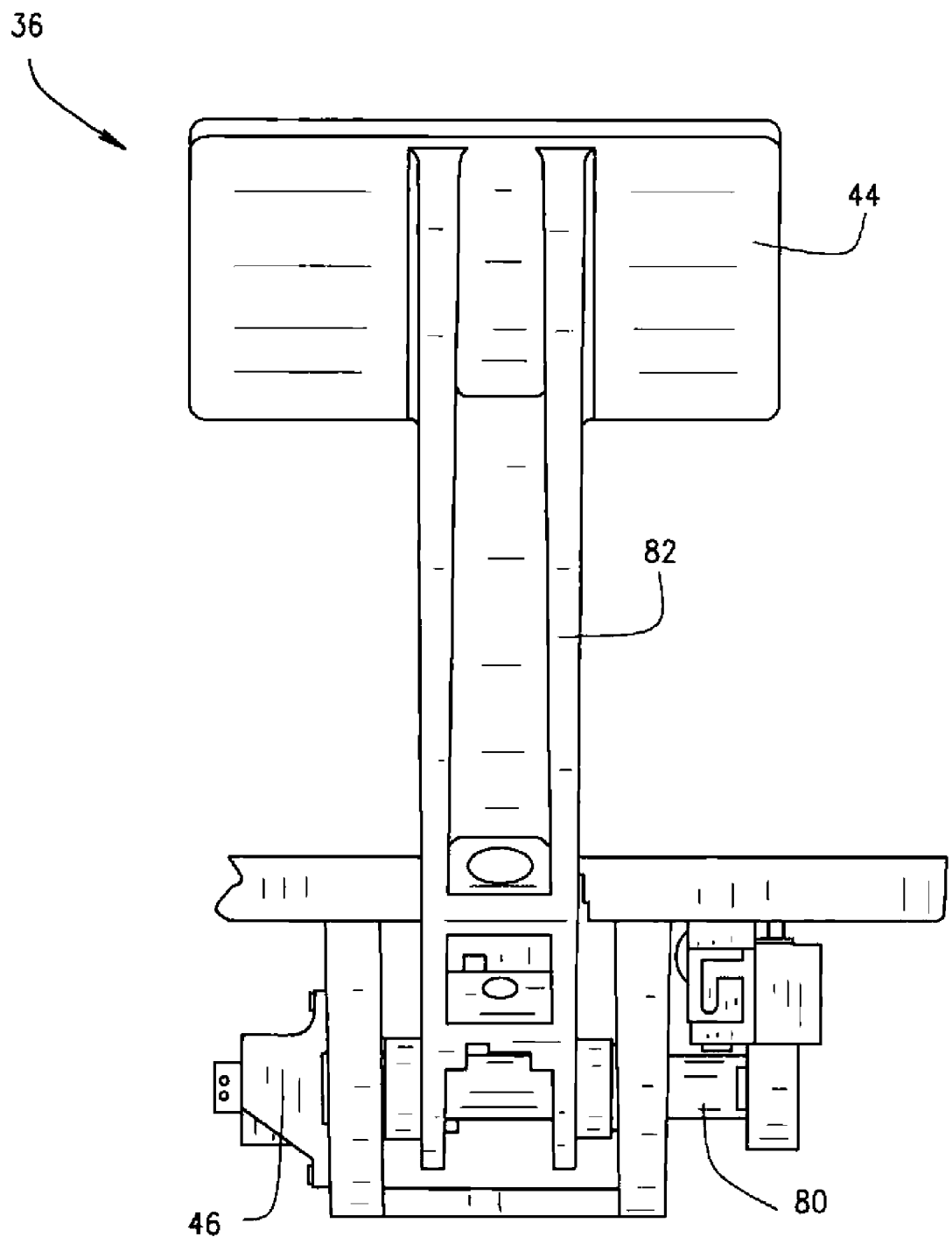
FIG. 3 is a front view of a brake pedal subassembly operably connected to the brake lighting system shown in FIG. 1, in accordance with various embodiments of the present disclosure.

Referring to FIGS. 2 and 3, in various embodiments, the brake pedal subassembly 36 includes a brake pedal shaft 80 affixed to a brake pedal arm 82 to which the brake pedal 44 is also connected. The brake pedal arm 82 is fixedly coupled to the brake pedal shaft 80 such that when the brake pedal 44 is depressed, moving the brake pedal arm 82, the brake pedal shaft 80 rotates in proportion to the amount of depression of the brake pedal 44. The position sensor 46 of brake lighting system 14 can be operably connected to the brake pedal shaft 80. Therefore, as the brake pedal 44 is depressed, the position sensor 46 senses the rotation of the brake pedal shaft 80 and transmits the brake pedal position signal 70, indicating the amount of rotation, to the controller 50. As described above, the brake position sensor 46 transmits the brake position signal 70 to the controller 50 that interprets the brake position signal 70 to determine whether to transmit the brake light signal 74 to the electronic switching device 66.

For example, when the brake pedal 44 is depressed to initiate a braking operation, the brake pedal shaft 80 rotates and the position sensor 46 detects the change in position of the brake pedal 44 and brake pedal shaft 80. Accordingly, the brake pedal position signal 70 transmitted by the position sensor 46 indicates to the controller 50 that a braking operation has been initiated. The controller 50 interprets the change in the brake pedal position signal 70 and transmits the brake light signal 74 to the electronic switching device 66. Upon receipt of the brake light signal 74, the electronic switching device 66 closes to complete the brake light circuit 54 and allow current to flow through and illuminate the brake lights (s) 62.

If the brake pedal is not depressed or released and returned to the non-depressed position, the corresponding rotational position of the brake pedal shaft 80 is sensed by the position sensor 46. Accordingly, the brake pedal position signal 70 transmitted by the position sensor 46 indicates to the controller 50 that a non-braking operation has been commanded. The controller 50 interprets the brake pedal position signal 70 and terminates or prevents transmission of the brake light signal 74 to the electronic switching device 66. Upon termination of the brake light signal 74, the electronic switching device 66 opens to break the brake light circuit 54 and prevent current from flowing through and illuminating the brake lights(s) 62. Accordingly, the electronic switching device 66 is moved to, or retained in, the open position such that current will not flow through the brake light circuit 54 and the brake light(s) 62 will be transitioned to or retained in the non-illuminated state.

Referring to FIGS. 2 and 4, in various embodiments, the vehicle 10 can comprise a modular accelerator and brake (A&B) assembly 86 that comprises the accelerator and brake subassemblies 34 and 36. An exemplary modular A&B assembly is described in copending patent application Ser. No. 11/163,844, filed Nov. 1, 2005, titled Modular Pedal Box Assembly, and assigned to the assignee of the present application, which is incorporated herein by reference. The brake pedal position sensor 46 is operably connected to the brake pedal subassembly 36 and is configured to sense the position of the brake pedal 44, as described above. As also described above, the position sensor 46 transmits the brake pedal position signal 70 that is interpreted by the controller 50. Based on the interpretation of the brake pedal position signal 70, the controller 50 controls transmission of the brake light signal 74, thereby controlling illumination of the brake light(s) 62, as describe above.

The description herein is merely exemplary in nature and, thus, variations that do not depart from the gist of that which is described are intended to be within the scope of the teachings. Such variations are not to be regarded as a departure from the spirit and scope of the teachings. Additionally, in the event that one or more of the incorporated literature and similar materials differs from or contradicts this application, including but not limited to defined terms, term usage, described techniques, or the like, this application controls.

What is claimed is:

1. A brake lighting system for a lightweight utility vehicle, said system comprising:
    a brake pedal rotary position sensor operable connected to a brake pedal shaft having a brake pedal coupled thereto and operable to rotate in conjunction with depression of the brake pedal, the rotary position sensor configured to transmit a brake pedal position signal indicative of an amount of rotation of the brake pedal shaft that is indicative of an amount of depression of the brake pedal;
    a controller communicatively connected to the brake pedal rotary position sensor and operable to receive the brake pedal position signal; and
    an electronic switching device communicatively connected to the controller.

2. The system of claim 1, wherein the controller is adapted to transmit a brake light signal to the electronic switching device when the brake pedal position signal from the brake pedal position sensor exceeds a predetermined upper threshold value.

3. The system of claim 2, wherein the predetermined upper threshold value is approximately 5% to 15% of a maximum value of the brake pedal position signal.

4. The system of claim 2, wherein the electronic switching device closes the brake light circuit when receiving the brake light signal from the controller so that current flows through the brake light circuit illuminating at least one brake light.

5. The system of claim 2, wherein the controller is adapted to prevent transmission of the brake light signal to the electronic switching device when the brake pedal position signal from the brake pedal position sensor is less than a predetermined lower threshold value.

6. The system of claim 5, wherein the predetermined lower threshold value is approximately 2% to 8% of a maximum value of the brake pedal position signal.

7. The system of claim 1, wherein the electronic switching device opens a brake light circuit when not receiving a brake light signal from the controller so that current does not flow through the brake light circuit and a brake light is not illuminated.

8. A method for controlling illumination of a lightweight utility vehicle brake light, said method comprising:
    transmitting a brake pedal position signal from a brake pedal rotary position sensor to a controller, the rotary position sensor operably connected to a rotary brake pedal shaft having a brake pedal coupled thereto and operable to rotate in conjunction with depression of the brake pedal, the brake pedal position signal indicative of an amount of rotation of the brake pedal shaft that is indicative of an amount of depression of the brake pedal and variable between a minimum value and a maximum value;
    transmitting a brake light signal from the controller to an electronic switching device when the brake pedal position signal exceeds an upper predetermined amount of the maximum value; and
    closing the electronic switching device in response to brake light signal to close a brake light circuit and provide current to a brake light for illuminating the brake light.

9. The method of claim 8, wherein transmitting the brake light signal comprises transmitting the brake light signal from the controller to the electronic switching device when the brake pedal position signal exceeds approximately 5% to 15% of the minimum value.

10. The method of claim 8, wherein the method further comprises terminating transmission of the brake light signal when the brake pedal position signal is less than a lower predetermined amount of the maximum value.

11. The method of claim 10, wherein the method further comprises opening the electronic switching device when transmission of the brake light signal is terminated to open the brake light circuit such that current flow through the brake light circuit is terminated and the brake light is extinguished.

12. The method of claim 10, wherein terminating transmission of the brake light signal comprises terminating transmission of the brake light signal when the brake pedal position signal is less than approximately 2% to 8% of the minimum value.

13. A brake lighting system for a lightweight utility vehicle, said system comprising:
    a brake pedal rotary position sensor operably connected to a brake pedal shaft having a brake pedal coupled thereto and operable to rotate in conjunction with depression of the brake pedal, the rotary position sensor configured to transmit a brake pedal position signal indicative of an amount of rotation of the brake pedal shaft that is indicative of an amount of depression of the brake pedal, the brake pedal position signal variable between a minimum value and a maximum value;
    a controller configured to receive the brake pedal position signal and transmit a brake light signal; and
    a brake light circuit comprising a power source, at least one brake light and an electronic switching device configured to receive the brake light signal from the controller and control current flow through the brake light circuit.

14. The system of claim 13, wherein the electronic switching device closes the brake light circuit when receiving the brake light signal such that current flows through the brake light circuit illuminating the brake light.

15. The system of claim 13, wherein the electronic switching device opens the brake light circuit when not receiving the brake light signal such that current does not flow through the brake light circuit and the brake light is not illuminated.

16. The system of claim 13, wherein the controller comprises programming to transmit the brake light signal to the electronic switching device when the brake pedal position signal exceeds a predetermined upper threshold value indicating a braking operation of the vehicle.

17. The system of claim 16, wherein the predetermined upper threshold value is approximately 5% to 15% of a maximum value of the brake pedal position signal.

18. The system of claim 16, wherein the predetermined upper threshold value is approximately 10% of a maximum value of the brake pedal position signal.

19. The system of claim 13, wherein the controller comprises programming to prevent transmission of the brake light signal to the electronic switching device when the brake pedal position signal is below a predetermined lower threshold value indicating a non-braking operation of the vehicle.

20. The system of claim 19, wherein the predetermined lower threshold value is approximately 2% to 8% of a maximum value of the brake pedal position signal.

21. The system of claim 19, wherein the predetermined lower threshold value is approximately 4% of a maximum value of the brake pedal position signal.

22. A lightweight utility vehicle comprising:
a brake lighting system comprising:
a brake pedal rotary position sensor operably connected to a brake pedal shaft having a brake pedal coupled thereto and operable to rotate in conjunction with depression of the brake pedal, the rotary position sensor configured to transmit a brake pedal position signal indicative of an amount of rotation of the brake pedal shaft that is indicative of an amount of depression of the brake pedal, the brake pedal position signal variable between a minimum value and a maximum value;
a controller configured to:
receive the brake pedal position signal and transmit a brake light signal when the brake position signal exceeds an predetermined upper amount of the maximum value; and
terminate transmission of the brake light signal when the brake position signal is less than a predetermined lower amount of the maximum value; and
a brake light circuit comprising a power source, at least one brake light and an electronic switching device configured to:
receive the brake light signal and enable a current flow through the brake light circuit in response thereto to illuminate the brake light; and
prevent current flow through the brake light circuit upon termination of the brake light signal, to extinguish illumination of the brake light.

23. The vehicle of claim 22, wherein the predetermined upper predetermined upper amount of the maximum value is approximately 5% to 15% of a maximum value.

24. The vehicle of claim 22, wherein the predetermined lower amount of the minimum value is approximately 2% to 8% of a maximum value.

* * * * *

UNITED STATES PATENT AND TRADEMARK OFFICE
CERTIFICATE OF CORRECTION

PATENT NO.         : 7,400,238 B2                                   Page 1 of 1
APPLICATION NO. : 11/421882
DATED                 : July 15, 2008
INVENTOR(S)        : Warren W. Clark et al.

It is certified that error appears in the above-identified patent and that said Letters Patent is hereby corrected as shown below:

IN THE ABSTRACT, Line 5 on the title page item (57), "controller of interprets" should be -- controller interprets --.

Column 1, Lines 32-33 on the title page item (57), "controller of interprets" should be -- controller interprets --.

Column 2, Line 9 on the title page item (57), "light 16 The" should be -- light 16. The --.

Column 5, Line 39 (claim 1, line 3) "operable connected" should be -- operably connected --.

Column 8, Line 11 (claim 22, line 12) "exceeds an predetermined" should be -- exceeds a predetermined --.

Column 8, Line 26 (claim 23, line 2) "predetermined upper predetermined upper amount" should be -- predetermined upper amount --.

Signed and Sealed this

Twenty-third Day of December, 2008

JON W. DUDAS
*Director of the United States Patent and Trademark Office*